United States Patent
Deng et al.

(10) Patent No.: US 9,676,363 B1
(45) Date of Patent: *Jun. 13, 2017

(54) MULTI-CHAMBERED AIRBAG WITH CONTROLLED PRESSURE DIFFERENTIALS

(71) Applicant: Ford Global Technologies, LLC, Dearborn, MI (US)

(72) Inventors: Zhibing Deng, Northville, MI (US); Krish E. Aekbote, Novi, MI (US); Srinivas Reddy Malapati, Novi, MI (US); Gustavo Morales Cabrera, Ecatepec de Morelos (MX)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/130,552

(22) Filed: Apr. 15, 2016

(51) Int. Cl.
  *B60R 21/233* (2006.01)
  *B60R 21/0132* (2006.01)
  (Continued)

(52) U.S. Cl.
  CPC ........ *B60R 21/233* (2013.01); *B60R 21/0132* (2013.01); *B60R 21/203* (2013.01); *B60R 21/205* (2013.01); *B60R 21/235* (2013.01); *B60R 21/239* (2013.01); *B60R 21/2334* (2013.01); *B60R 21/264* (2013.01); *B60R 2021/0023* (2013.01); *B60R 2021/0032* (2013.01); *B60R 2021/0044* (2013.01); *B60R 2021/0048* (2013.01); *B60R 2021/0058* (2013.01); *B60R 2021/23107* (2013.01); *B60R 2021/23308* (2013.01); *B60R 2021/23324* (2013.01); *B60R 2021/23509* (2013.01)

(58) Field of Classification Search
  CPC ... B60R 21/233; B60R 21/205; B60R 21/239; B60R 21/203; B60R 2021/2395; B60R 2021/23382; B60R 2021/0048; B60R 2021/23308; B60R 2021/0058; B60R 2021/23324; B60R 2021/0044; B60R 2021/0023; B60R 2021/23107
  See application file for complete search history.

(56) References Cited

U.S. PATENT DOCUMENTS

| | | | | |
|---|---|---|---|---|
| 3,752,501 A | * | 8/1973 | Daniel | B60R 21/233 280/729 |
| 4,111,458 A | * | 9/1978 | Okada | B60R 21/239 244/138 R |

(Continued)

FOREIGN PATENT DOCUMENTS

| | | |
|---|---|---|
| CN | 102975682 A | 3/2013 |
| CN | 203651697 U | 6/2014 |

(Continued)

OTHER PUBLICATIONS

Non-Final Rejection issued Jul. 5, 2016 in the prosecution history of U.S. Appl. No. 14/927,759.

(Continued)

*Primary Examiner* — Drew Brown
(74) *Attorney, Agent, or Firm* — James P. Muraff; Neal Gerber & Eisenberg LLP

(57) ABSTRACT

The present disclosure relates to a multi-chambered airbag system employing the use of baffle vents to achieve pressure differentials between the different chambers and methods of using the same.

20 Claims, 6 Drawing Sheets

(51) Int. Cl.
  *B60R 21/203* (2006.01)
  *B60R 21/205* (2011.01)
  *B60R 21/2334* (2011.01)
  *B60R 21/235* (2006.01)
  *B60R 21/264* (2006.01)
  *B60R 21/239* (2006.01)
  B60R 21/00 (2006.01)
  B60R 21/231 (2011.01)

(56) References Cited

U.S. PATENT DOCUMENTS

| | | | |
|---|---|---|---|
| 5,007,662 A * | 4/1991 | Abramczyk | B60R 21/239 |
| | | | 280/739 |
| 5,249,824 A * | 10/1993 | Swann | B60R 21/233 |
| | | | 280/729 |
| 5,791,685 A | 8/1998 | Lachat et al. | |
| 5,845,935 A | 12/1998 | Enders et al. | |
| 6,254,121 B1 | 7/2001 | Fowler et al. | |
| 6,308,983 B1 * | 10/2001 | Sinnhuber | B60R 21/233 |
| | | | 280/735 |
| 6,419,262 B1 * | 7/2002 | Fendt | B60R 21/231 |
| | | | 280/729 |
| 6,962,363 B2 | 11/2005 | Wang et al. | |
| 7,111,866 B2 | 9/2006 | Abe et al. | |
| 7,264,268 B2 | 9/2007 | Ehrke | |
| 7,347,445 B2 | 3/2008 | Choi | |
| 7,396,043 B2 | 7/2008 | Choi et al. | |
| 7,431,329 B2 | 10/2008 | Taguchi et al. | |
| 7,540,533 B2 * | 6/2009 | Kai | B60R 21/239 |
| | | | 280/739 |
| 7,631,891 B2 | 12/2009 | Washino | |
| 7,661,700 B2 | 2/2010 | Imamura et al. | |
| 7,673,901 B2 | 3/2010 | Hanawa et al. | |
| 7,681,909 B2 | 3/2010 | Idomoto et al. | |
| 7,695,002 B2 | 4/2010 | Choi | |
| 7,810,840 B2 | 10/2010 | Denys et al. | |
| 7,900,961 B2 | 3/2011 | Hanawa et al. | |
| 8,038,169 B2 | 10/2011 | Rick | |
| 8,196,955 B2 | 6/2012 | Mendez | |
| 8,376,396 B2 | 2/2013 | Miller et al. | |
| 8,596,678 B2 | 12/2013 | Ravenberg et al. | |
| 8,678,429 B2 | 3/2014 | Nagasawa et al. | |
| 8,764,057 B1 | 7/2014 | Jamison et al. | |
| 8,794,667 B2 | 8/2014 | Bruzzone et al. | |
| 8,876,153 B2 * | 11/2014 | Dix | B60R 21/233 |
| | | | 280/729 |
| 9,045,109 B2 | 6/2015 | Rick | |
| 9,150,186 B1 | 10/2015 | Belwafa et al. | |
| 9,376,084 B2 * | 6/2016 | Choi | B60R 21/233 |
| 2003/0116945 A1 * | 6/2003 | Abe | B60R 21/231 |
| | | | 280/729 |
| 2003/0201630 A1 * | 10/2003 | Moon | B60R 21/239 |
| | | | 280/739 |
| 2009/0121462 A1 * | 5/2009 | Rick | B60R 21/206 |
| | | | 280/729 |
| 2009/0218796 A1 * | 9/2009 | Webber | B60R 21/233 |
| | | | 280/740 |
| 2009/0218797 A1 | 9/2009 | Perez Garcia | |
| 2009/0261564 A1 * | 10/2009 | Niwa | B60R 21/233 |
| | | | 280/743.2 |
| 2011/0175334 A1 * | 7/2011 | Miller | B60R 21/206 |
| | | | 280/730.2 |
| 2014/0239617 A1 * | 8/2014 | Dix | B60R 21/233 |
| | | | 280/728.2 |
| 2015/0158452 A1 | 6/2015 | Choi et al. | |
| 2015/0298643 A1 | 10/2015 | Schneider | |
| 2015/0307052 A1 | 10/2015 | Jaradi et al. | |
| 2015/0307055 A1 | 10/2015 | Cheng et al. | |
| 2015/0321636 A1 | 11/2015 | Jang | |

FOREIGN PATENT DOCUMENTS

| | | |
|---|---|---|
| CN | 204149989 U | 2/2015 |
| DE | 102013015682 A1 | 7/2014 |
| JP | 03032956 A | 2/1991 |
| WO | 0003898 A1 | 1/2000 |
| WO | WO 0003898 A1 | 1/2000 |

OTHER PUBLICATIONS

Final Rejection issued Aug. 12, 2016 in the prosecution history of U.S. Appl. No. 14/927,759.
Non-Final Rejection issued Sep. 6, 2016 in the prosecution history of U.S. Appl. No. 15/130,296.
Non-Final Rejection issued Sep. 7, 2016 in the prosecution history of U.S. Appl. No. 15/130,536.

* cited by examiner

MULTI-CHAMBERED AIRBAG WITH CONTROLLED PRESSURE DIFFERENTIALS

TECHNICAL FIELD

The present disclosure generally relates to an improved airbag system. More particularly, the airbag system of the present disclosure uses pressure differentials between different airbag chambers through the employment of a novel baffle vent design to minimize the injury to passengers of motor vehicles involved in impacts.

BACKGROUND

Airbags are generally deployed to minimize the injury to persons within a motor vehicle. Frontal impact airbags are designed to prevent occupants from sustaining injuries that could be the result of occupants being propelled forward and making contact with the steering wheel or other interior part of the vehicle. These pillow-shaped airbags deploy from the instrument panel through a pyrotechnic ignition which causes the bags to rapidly fill with gas.

Current airbag systems generally comprise an airbag made of fabric which inflates upon the system recognition of an impact. However, many airbag systems deploy an airbag that is not formally confirmed to any defined shape whereby the passenger, upon contact, may slide off the airbag. In most cases, upon impact, occupants will be propelled forward as well as laterally to some degree. This is where a typical airbag may not be sufficient in preventing bodily contact with the interior of the vehicle. During a collision in which there is offset or angular momentum, it is possible that the occupant may slip off the side of the airbag and make contact with the vehicle, thus increasing the likelihood of injury. There is a continuing need for new and improved airbag systems that enable a passenger to escape impacts with little or no injury.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Exemplary embodiments provide for an airbag system comprising: an airbag comprising a center chamber and two peripheral chambers; an inflator in fluid communication with the center chamber; the center chamber in fluid communication with the two peripheral chambers via internal baffle vents configured to facilitate gas flow from the center chamber to the two peripheral chambers and impede gas flow from the two peripheral chambers into the center chamber.

Each of the peripheral chambers may be configured to receive a passenger's head, chest, left shoulder, or right shoulder. At least one of the peripheral chambers may further comprises a tether. The peripheral chamber configured to receive the passenger's chest may comprise a chamber with a pressure in the range from about 120 to about 170 kPa and/or a depth in the range from about 4 inches to about 13 inches. The peripheral chamber configured to receive the passenger's head may comprise a chamber with a pressure in the range from about 120 to about 200 kPa and/or a depth in the range from about 6 inches to about 16 inches. The peripheral chamber configured to receive the passenger's left shoulder may comprise a chamber with a pressure in the range from about 120 to about 200 kPa and/or a depth in the range from about 6 to about 16 inches. The peripheral chamber configured to receive the passenger's right shoulder may comprise a chamber with a pressure in the range from about 120 to about 200 kPa and/or a depth in the range from about 6 to about 16 inches.

The gas pressure within the two peripheral chambers may be greater than the pressure in the center chamber when the airbag is fully inflated. The gas flow from the center chamber to any peripheral chamber of the two peripheral chambers may flow through one or more baffle vents located within chamber dividers, wherein the chamber dividers substantially separate adjacent chambers. The chamber dividers may be made of fabric. One or more baffle vents may have one or more holes disposed over a hole in the chamber divider. One or more holes in the baffle vent may comprise one central hole and four peripheral holes located approximately the same radial distance from the central hole. One or more baffle vents may comprise a means to impede gas flow from a peripheral chamber to the center chamber. Such means may be one or more flaps located in the peripheral chamber configured to partially or completely cover one or more holes in the baffle vent. The one or more flaps located in the peripheral chamber may be configured to partially or completely cover one or more holes in the baffle vent comprises four flaps individually disposed over peripheral holes in the baffle vent and one hole of the baffle vent uncovered by a flap.

Exemplary embodiments provide for an airbag deployment method comprising: obtaining, by a sensor, data external to a vehicle; identifying, by a controller using the data, a sudden deceleration; deploying an airbag system as described herein.

Exemplary embodiments provide for a vehicle comprising an airbag system as described herein.

BRIEF DESCRIPTION OF THE DRAWINGS

For a better understanding of the invention, reference may be made to embodiments shown in the following drawings. The components in the drawings are not necessarily to scale and related elements may be omitted to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

Figure 1:
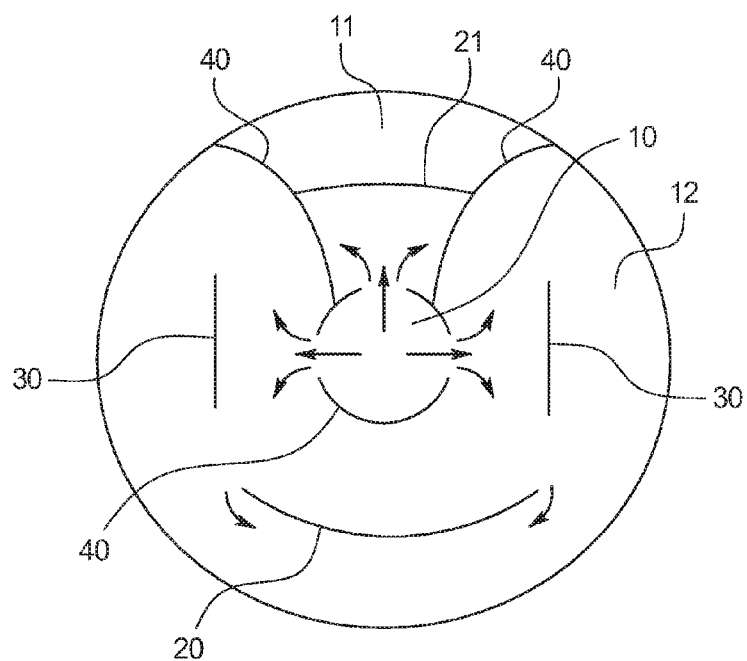
FIG. 1 is a schematic of the front view of aspects of one embodiment of the present airbag system.

While the airbag system of the present disclosure may be embodied in various forms, the Figures show and this Specification describes some exemplary and non-limiting embodiments of the airbag system comprising baffle vents to modulate pressure differentials between the different airbag chambers. The term "airbag system" is intended to mean both the inflatable passenger-restraining multi-chambered airbag and the mechanical and chemical components (such as the inflation means, ignition means, propellant, and the like). The present disclosure is an exemplification of the airbag system and does not limit the airbag system to the specific illustrated and described embodiments. Not all of the depicted or described components may be required, and some embodiments may include additional, different, or fewer components. The arrangement and type of the components may vary without departing from the spirit or scope of the claims set forth herein.

One of ordinary skill in the art will appreciate the various aspects of airbag design, construction, and operation applicable to the embodiments of the present disclosure. U.S. Pat. Nos. 6,886,857, 7,857,347, 8,128,124, 8,322,748, for example, describe many such aspects and are incorporated herein by reference in their entirety.

In one embodiment, the airbag system comprises a four-chambered airbag design. In another embodiment, the airbag system comprises a two-chambered airbag design. In yet another embodiment, the airbag system comprises a multi-chambered winged airbag design. This winged airbag design comprises additional peripheral airbag chambers. In embodiments, the additional peripheral airbag chambers may be duffels attached or integrated into a primary airbag.

The present airbag may be constructed out of any pliable material, including polyamide 6, 6 fiber, polyesters, and others, which have the appropriate thermal capacity, toughness, modulus, etc. Representative fabrics for such use are disclosed in U.S. Pat. Nos. 4,921,735; 5,093,163; 5,110,66; 5,236,775; 5,277,230; 5,356,680; 5,477,890; 5,508,073; 5,503,197; 5,704,402, all of which are incorporated herein by reference in their entirety. The airbag may be made from a single layer or a plurality of layers.

In each embodiment, the present airbag system comprises a baffle vent design to facilitate pressure differentials between the different chambers of the airbag. Once an airbag-deploying event has been sensed by the vehicle, air or another gas is introduced into a central chamber of the airbag. The air or gas builds up to a certain pressure within the central chamber and then is passively diffused into the peripheral chamber(s). Under normal circumstances where air or gas can freely flow to and from the central and peripheral chamber(s), the pressure in each chamber would be substantially the same. However, in the present disclosure, a baffle vent is employed so that a pressure differential exists between the peripheral and central chambers. Through the use of these baffle vents, the pressure within the peripheral chamber(s) is greater than the pressure of the central chamber once the airbag is fully deployed.

The baffle vents in the present airbag system are incorporated into one or more dividers. A single divider may be made of a single layer or a plurality of layers. Dividers in the present airbag define the different chambers. These dividers can be made of any pliable material used to construct the present airbag. Within the dividers, one or more holes may be present to allow gas to flow from one chamber to another chamber. Absent any baffle vents, the holes in the dividers would allow gas to flow between adjacent airbag chambers until a substantially equal pressure existed between the adjacent chambers. However, the use of the present baffle vents in the present airbag system allows the gas to flow from a first chamber to a second adjacent chamber whereby the pressure in the second adjacent chamber is greater than the pressure in the first chamber. This pressure differential between adjacent chambers is accomplished due to the present baffle vent design. The present baffle vent design allows gas to freely flow from a first chamber to a second adjacent chamber and impede the flow of gas from the second adjacent chamber to the first chamber. This impediment creates the pressure differential because the pressures within the present airbag are not allowed to stabilize uniformly.

In some embodiments, the first chamber is a central chamber that receives gas directly from the inflator and the second adjacent chamber is a peripheral chamber directly adjacent to the central chamber. In this embodiment, a plurality of peripheral chambers may be used. In other embodiments, the first chamber is a peripheral chamber directly adjacent to a central chamber and the second adjacent chamber is a another peripheral chamber directly adjacent to the central chamber. In yet other embodiments, the first chamber is a peripheral chamber directly adjacent to the central chamber and the second adjacent chamber is an additional peripheral chamber directly adjacent to the peripheral chamber.

The present baffle vents comprise a plurality of holes that function as passages for gas to flow from a first chamber into a second adjacent chamber. In embodiments, the present baffle vents comprise 2 to 21 holes. In other embodiments, the present baffle vents comprise 2 holes; alternatively, 3 holes; alternatively, 4 holes; alternatively, 5 holes; alternatively, 6 holes; alternatively, 7 holes; alternatively, 8 holes; alternatively, 9 holes; alternatively, 10 holes; or alternatively, 11 holes.

The present baffle vents further comprise a means for impeding gas flow from a second adjacent chamber to a first chamber. In embodiments, the means for impeding gas flow from a second adjacent chamber to a first chamber comprises a flap disposed within the second adjacent chamber that functions to allow gas to flow into the second adjacent chamber, but impedes or substantially blocks gas flow from the second adjacent chamber to the first chamber. In other embodiments, the means for impeding gas flow from a second adjacent chamber to a first chamber comprises a baffle vent design whereby the baffle vent collapses when gas attempts to flow from a second adjacent chamber to a first chamber such that one or more holes present in the baffle vent is blocked by the divider.

The present baffle vents impede gas flow from a second chamber to a first chamber by obstructing one or more holes in the baffle vent that allow gas to flow freely from the first chamber to the second adjacent chamber, but not vice versa. For example, if X holes are available for gas to flow from a first chamber to a second adjacent chamber, the present baffle vent comprises (X-1) of holes available for gas to flow from a second adjacent chamber to the first chamber; alternatively, (X-2) of holes available for gas to flow from a second adjacent chamber to the first chamber; alternatively, (X-3) of holes available for gas to flow from a second adjacent chamber to the first chamber; alternatively, (X-4) of holes available for gas to flow from a second adjacent chamber to the first chamber; alternatively, (X-5) of holes available for gas to flow from a second adjacent chamber to the first chamber; alternatively, (X-6) of holes available for gas to flow from a second adjacent chamber to the first chamber; alternatively, (X-7) of holes available for gas to flow from a second adjacent chamber to the first chamber; alternatively, (X-8) of holes available for gas to flow from a second adjacent chamber to the first chamber; alternatively, (X-9) of holes available for gas to flow from a second adjacent chamber to the first chamber; alternatively, (X-10) of holes available for gas to flow from a second adjacent chamber to the first chamber; alternatively, (X-11) of holes available for gas to flow from a second adjacent chamber to the first chamber; alternatively, (X-12) of holes available for gas to flow from a second adjacent chamber to the first chamber; alternatively, (X-13) of holes available for gas to flow from a second adjacent chamber to the first chamber; alternatively, (X-14) of holes available for gas to flow from a second adjacent chamber to the first chamber; alternatively, (X-15) of holes available for gas to flow from a second adjacent chamber to the first chamber; alternatively, (X-16) of holes available for gas to flow from a second adjacent chamber to the first chamber; alternatively, (X-17) of holes available for gas to flow from a second adjacent chamber to the first chamber; alternatively, (X-18) of holes available for gas to flow from a second adjacent chamber to the first chamber; alternatively, (X-19) of holes available for gas to flow from a second adjacent chamber to the first chamber; alternatively, (X-20) of holes available for gas to flow from a second adjacent chamber to the first chamber.

The present baffle vents may be disposed in any divider. In embodiments, the present baffle vents may be disposed within dividers between a central chamber and a peripheral chamber. In embodiments, the present baffle vents may be disposed within dividers between adjacent peripheral chambers. In embodiments, the present baffle vents may be disposed within dividers between a peripheral chamber adjacent to the central chamber and an additional peripheral chamber adjacent to the peripheral chamber. In these embodiments, a pressure differential may exist between the different chambers.

In some embodiments, the pressure in a central chamber is less than the pressure in a peripheral chamber. In some embodiments, the pressure in a central chamber may range from about 120 to about 170 kPa; alternatively, 120 to 170 kPa; alternatively, 120 to 150 kPa; alternatively, 140 to 170 kPa; or alternatively, 130 to 160 kPa. In some embodiments, the pressure in a peripheral chamber may range from about 120 to about 200 kPa; alternatively, 120 to 200 kPa; alternatively, 120 to 160 kPa; alternatively, 160 to 200 kPa; alternatively, 140 to 180 kPa; or alternatively, 130 to 170 kPa. In some embodiments, the pressure in an additional peripheral chamber may range from about 120 to about 200 kPa; alternatively, 120 to 200 kPa; alternatively, 120 to 160 kPa; alternatively, 160 to 200 kPa; alternatively, 140 to 180 kPa; or alternatively, 130 to 170 kPa. In some embodiments, tethers may be incorporated into the present airbag to ensure the airbag deploys with the desired geometry. In some embodiments, the desired geometry may have peripheral chambers with a greater depth than the central chamber to ensure the passenger does not contact an undesired aspect of the vehicle. In other embodiments, the desired geometry may have different depths depending on the intended contact zones. For example, it may be advantageous in some embodiments to have the chamber involved with the chest contact zone to have a greater depth than the chamber involved with the head contact zone. As another example, it may be advantageous in some embodiments to have the left and/or right shoulder contact zones to have a greater depth than the head and/or chest contact zones.

In some embodiments, the depth of the central chamber may range from about 4 to about 13 inches; alternatively, 4 to 13 inches; alternatively, 4 to 8 inches; alternatively, 9 to 13 inches; or alternatively 7 to 11 inches. In some embodiments, the depth of the peripheral chambers may range from about 6 to about 16 inches; alternatively, 6 to 16 inches; alternatively, 6 to 11 inches; alternatively, 11 to 16 inches; or alternatively, 8.5 to 13.5 inches. In some embodiments, the depth of the additional peripheral chambers may range from from about 6 to about 16 inches; alternatively, 6 to 16 inches; alternatively, 6 to 11 inches; alternatively, 11 to 16 inches; or alternatively, 8.5 to 13.5 inches.

Figure 2:
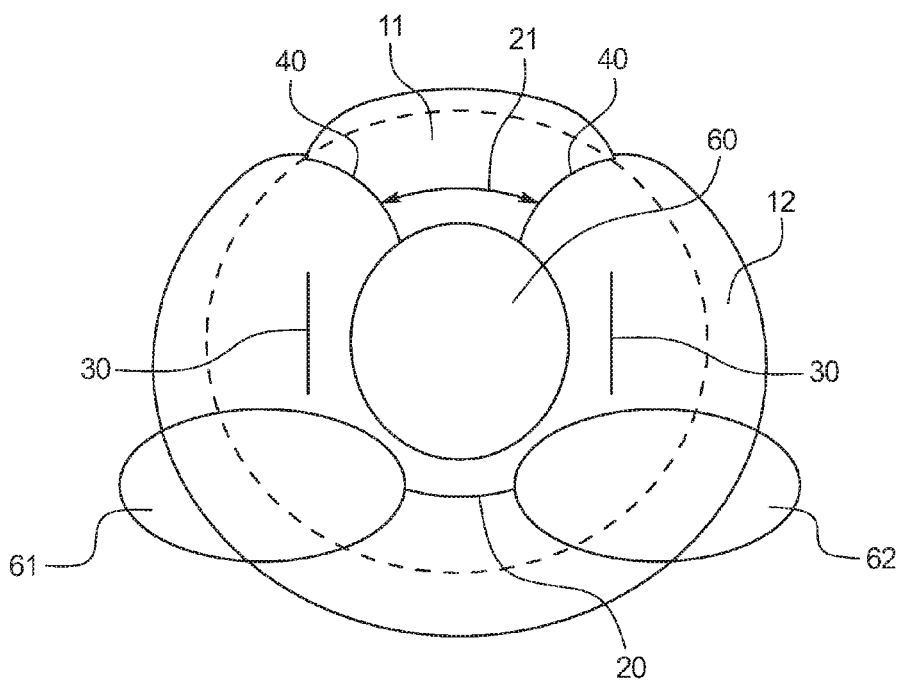
FIG. 2 is a schematic of the present airbag system of FIG. 1 in a deployed state further identifying contact zones.

Turning to the figures, the embodiments provided herein are described in detail. FIG. 1 depicts aspects of an embodiment of the present airbag system. An inflator (not shown) is fluidly connected to introduce gas into the central chamber 10. The initial gas flow is shown by the arrows flowing from the central chamber 10 to peripheral chambers 11, 12. Dividers 40 are used to define these chambers. Holes within the dividers allow gas to flow from one chamber to another. Tethers 20, 21 are used to control the geometry or stiffness of the airbag in its deployed state. Stitching 30 in the airbag can also be used to control the desired geometry of the present airbag in its deployed state. Element 30 may also be a tether to control the stiffness or depth of the peripheral chamber. FIG. 2 shows the airbag of FIG. 1 in its deployed state. Each of the chambers 10 (not shown), 11, 12 expands upon introduction of gas into each chamber and fills a portion of the void within the vehicle's passenger compartment. In this embodiment, present baffle vents would be disposed over the holes where the arrows are showing gas flow through, and optionally within any other divider 40. One or more baffle vents 50 may be disposed within any or all of the dividers 40 present in this embodiment, including dividers 40 between the peripheral chambers 11, 12 (not shown). Further, baffle vents 50 may be disposed in the dividers between the central chamber 10 and the adjacent peripheral chambers 11, 12. The presence of these baffle vents 50 will control the pressure differentials between the different chambers. FIG. 2 further identifies the head contact zone 60, the left-shoulder contact zone 61, and the right shoulder contact zone 62 of an embodiment of the present airbag system. In this embodiment, the head contact zone comprises a lower pressure chamber surrounded by higher pressure chambers, which allows the head to be stabilized and prevents the head rolling off the airbag and contacting an aspect of the vehicle.

Figure 3:
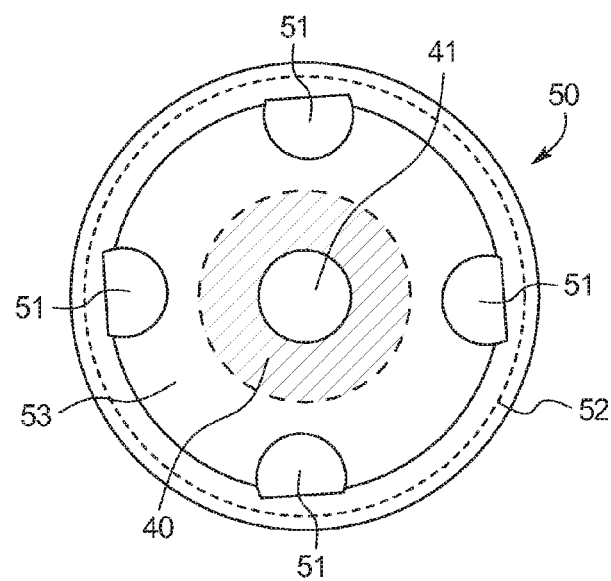
FIG. 3 is a representation of an embodiment of the baffle vents used in the present airbag system.

FIG. 3 depicts the front view of a present baffle vent 50 from a perspective from a second adjacent chamber looking into a first chamber. The present baffle vent 50 is disposed over a hole 41 in a divider 40. The present baffle vent is attached to the divider along the edge of the baffle vent 52 using conventional means, such as sewing, riveting, gluing, etc. The baffle vent may be constructed of coated fabric (similar to airbag material). Aspects of the baffle vent are solid 53 and do not allow gas to flow therethrough. In this embodiment, a total of 5 holes are present in the baffle vent 50: one centered in the baffle vent and four located at a substantially uniform radius from the center hole. FIG. 3 shows a cut-away of the sold portion of the baffle vent 53 to show the divider 40 and its respective hole 41. In this embodiment, the hole of the divider 41 is in alignment with the hole(s) of the baffle vent. See FIG. 4B, element 55. A plurality of holes in the baffle vent (not shown) may be covered by a plurality of flaps 51. These flaps 51 allow gas to flow from a first chamber 10 to a second adjacent chamber when pressure from the first chamber forces them open. These flaps 51 also impede or substantially block the flow of gas from the second adjacent chamber to the first chamber, even when the pressure within the second adjacent chamber is greater than the pressure within the first chamber.

Figure 4A:
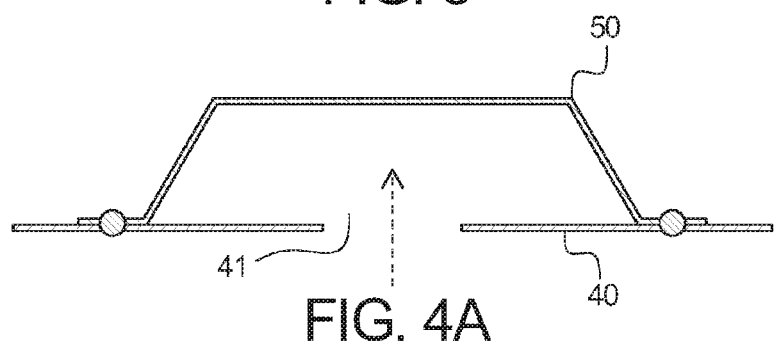
FIGS. 4A-4C depict air flow through an embodiment of the baffle vents shown in FIG. 3.
Figure 4B:
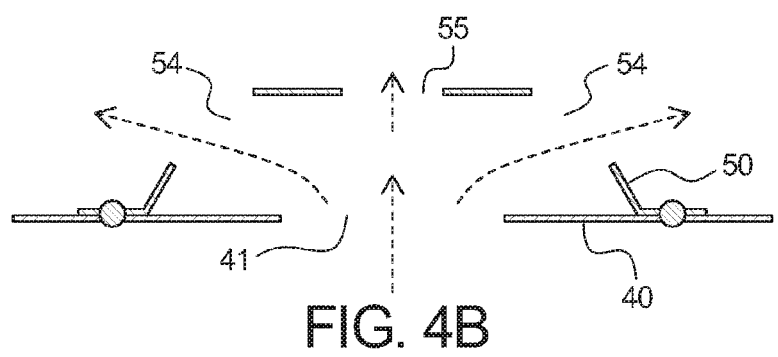
Figure 4C:
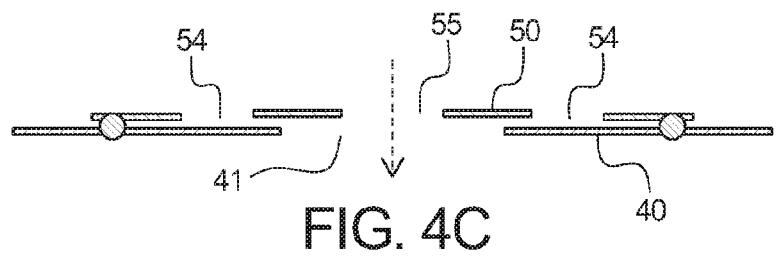

FIGS. 4A through 4C show a side perspective view of one embodiment of the present baffle vents. FIG. 4A shows that the present baffle vent covers a hole 41 in the divider 40 and is attached to the divider. FIG. 4B shows when gas pressure increases from a first chamber, the gas freely flows from a first chamber to a second adjacent chamber through a plurality of holes 54, 55 in the baffle vent. FIG. 4C depicts when the pressure in the second adjacent chamber reaches a certain level, gas will attempt to flow back into the first chamber from the second adjacent chamber. When the gas attempts to flow back into the first chamber, the orientation of the present baffle vent changes and collapses toward the hole 41 in the divider 40. When collapsed, some of the holes 54 that previously allowed gas to flow from the first chamber to the second adjacent chamber (FIG. 4B), are blocked by the wall of the divider 40, thus impeding the flow of gas to the first chamber. In some embodiments one or more holes of the present baffle vent are not blocked 55 under conditions presented in FIG. 4C.

Figure 5:
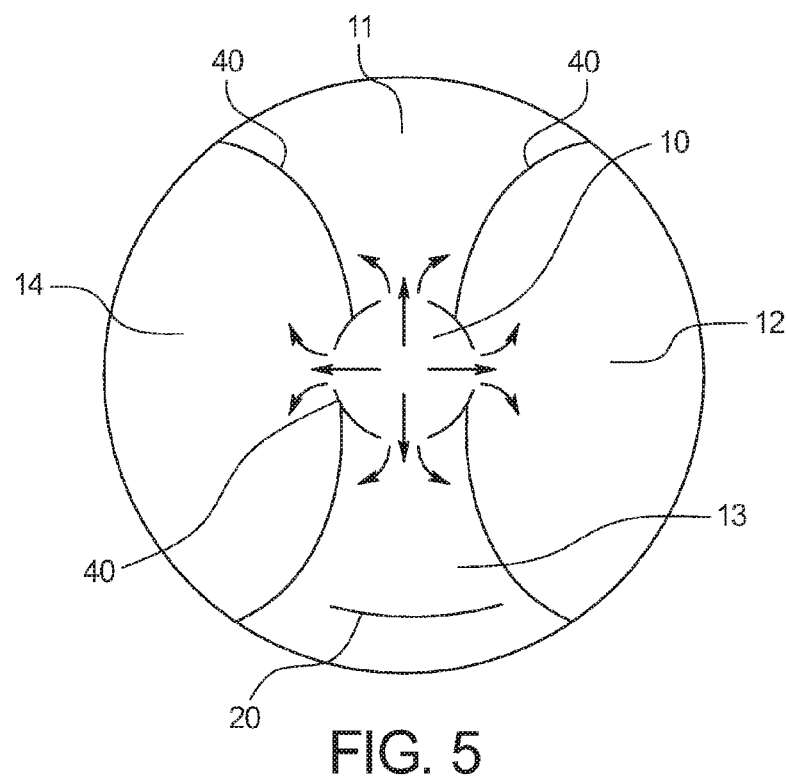
FIG. 5 is a schematic of the front view of aspects of one embodiment of the present airbag system.

FIG. 5 depicts the front view of another embodiment of the present airbag wherein a total of four peripheral chambers 11, 12, 13, 14 are present and are in direct fluid communication with a central chamber 10. The arrows in FIG. 5 represent the airflow from the inflator to the central chamber 10 and then to the adjacent peripheral chambers 11, 12, 13, 14. The dimensions of each chamber are defined, in part, by the dividers 40 disposed within the present airbag. Tethers 20 may be used to control the stiffness and depth of any chamber. FIG. 5 shows a tether 20 disposed within one peripheral chamber 13. One or more baffle vents 50 may be disposed within any or all of the dividers 40 present in this embodiment, including dividers 40 between the peripheral chambers 11, 12, 13, 14 (not shown). Further, baffle vents 50 may be disposed in the dividers between the central chamber 10 and the adjacent peripheral chambers 11, 12, 13, 14. The presence and orientation of these baffle vents 50 will control the pressure differentials between the different chambers.

Figure 6:
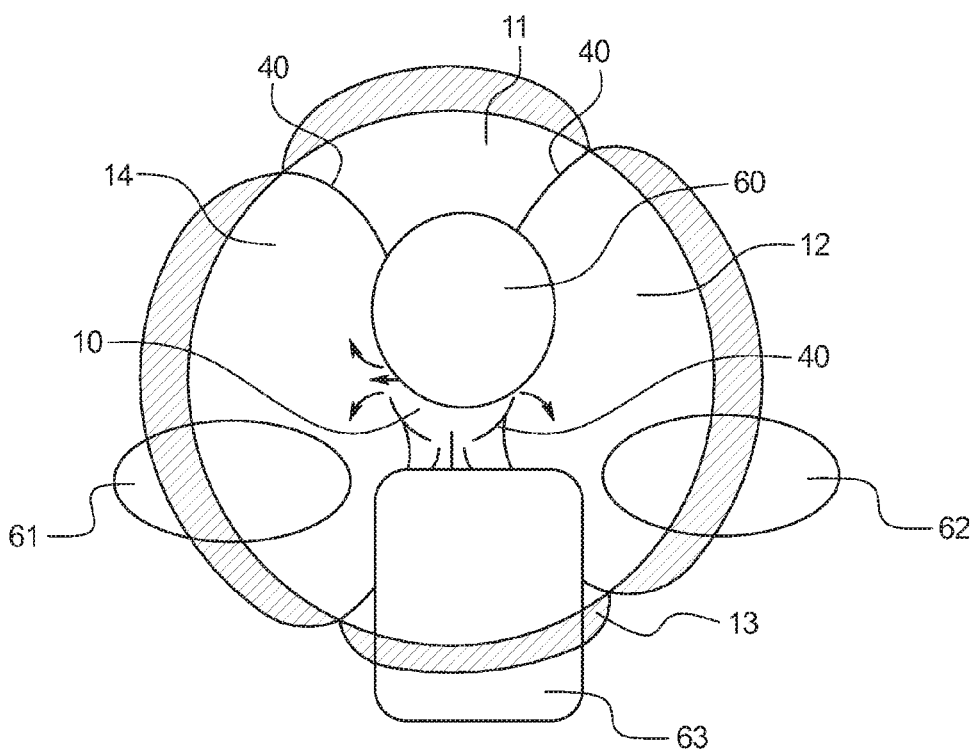
FIG. 6 is a schematic of the present airbag system of FIG. 5 in a deployed state further identifying contact zones.

FIG. 6 represents the front view of the airbag of FIG. 5 in a deployed state. In this embodiment, the airbag is designed to have a head contact zone 60, a left shoulder contact zone 61, a right shoulder contact zone 62, and a chest contact zone 63. The head contact zone comprises portions of the central chamber 10, the top peripheral chamber 11, the left peripheral chamber 14, and the right peripheral chamber 12. The chest contact zone 63 comprises portions of the left peripheral chamber 14, the right peripheral chamber 12, and the bottom peripheral chamber 13. Comparing FIG. 5 (undeployed state) with FIG. 6 (deployed state), one or ordinary skill would appreciate the volume of the airbag in the deployed state increases (represented by shading) while it fills a portion of the vehicle's passenger compartment.

Figure 7:
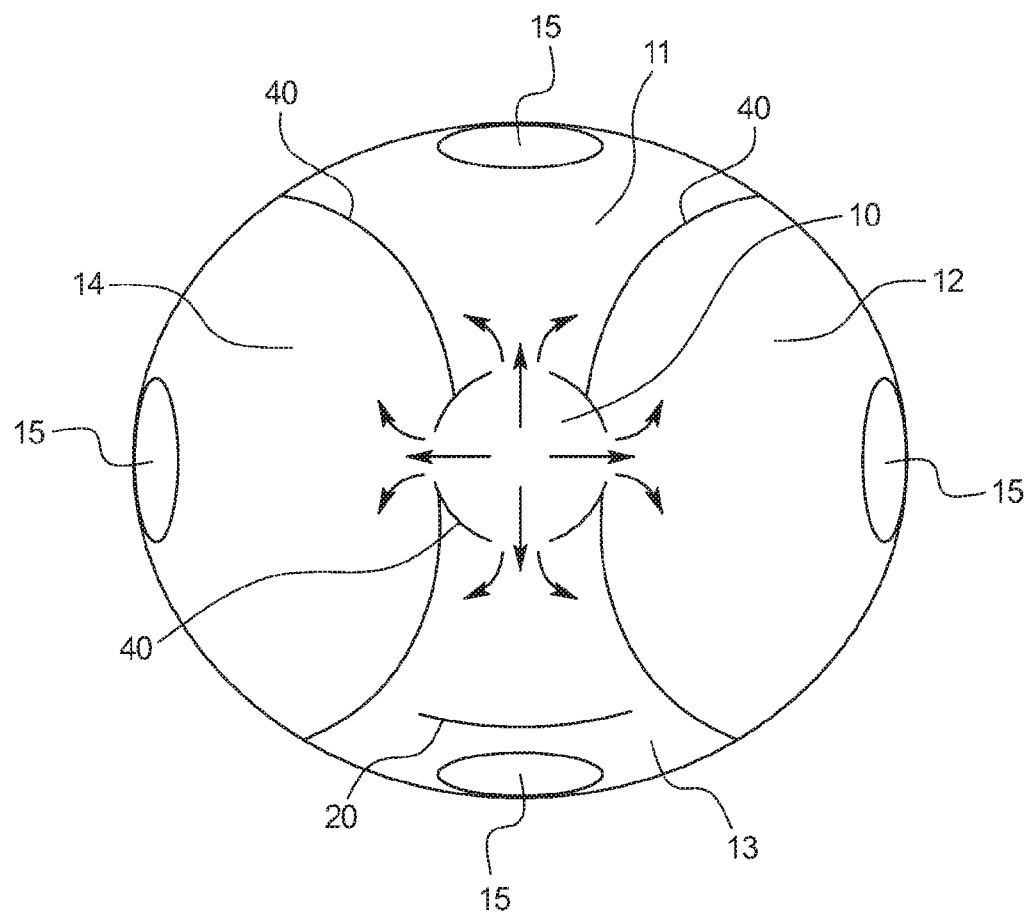
FIG. 7 is a schematic of the front view of aspects of one embodiment of the present airbag system.

FIG. 7 depicts the front view of yet another embodiment of the present airbag wherein a total of four peripheral chambers 11, 12, 13, 14 are present and are in direct fluid communication with a central chamber 10. In this embodiment, additional peripheral chambers 15 are disposed within peripheral chambers 11, 12, 13, 14. In some embodiments, these additional peripheral chambers 15 may be additional chambers formed by the presence of additional dividers 40. In other embodiments, these additional peripheral chambers may be duffels attached to or integrated into the primary airbag. The additional peripheral chambers 15 must be attached in a manner that allows gas to flow from the adjacent peripheral chamber 11, 12, 13, 14 into the respective additional peripheral chamber 15. In some embodiments, the pressure in these additional peripheral chambers 15 is equal to the pressure in the adjacent peripheral chamber 11, 12, 13, 14. In other embodiments, the pressure in these additional peripheral chambers is greater to the pressure in the adjacent peripheral chambers 11, 12, 13, 14 when baffle vents are disposed between the adjacent peripheral chamber 11, 12, 13, 14 and the additional peripheral chamber 15. As would be appreciated by those skilled in the art, the pressure differentials between different chambers is a function or the number of present baffle vents and their orientation.

Figure 8:
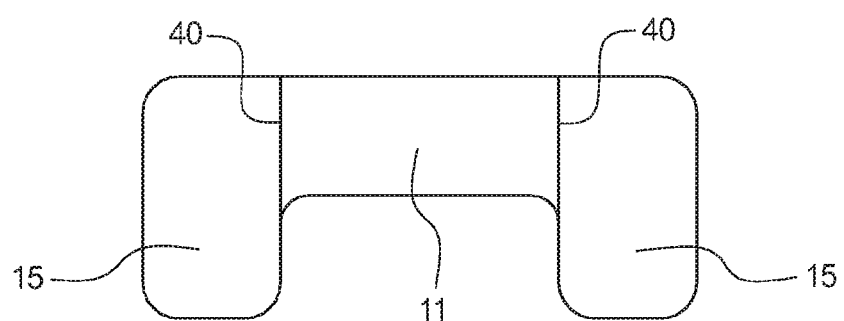
FIG. 8 is a top view of aspects of one embodiment of the present airbag system.

FIG. 8 represents a top view of the deployed airbag similar to the airbag depicted in FIG. 7. In this embodiment, the additional peripheral chambers have a greater depth than the top peripheral chamber 11. The additional airbag 15 adjacent to the top peripheral chamber 11 is not shown in this figure. These additional peripheral chambers with a greater depth provide additional protection for passengers involved in lateral or partially lateral impact events.

Figure 9:
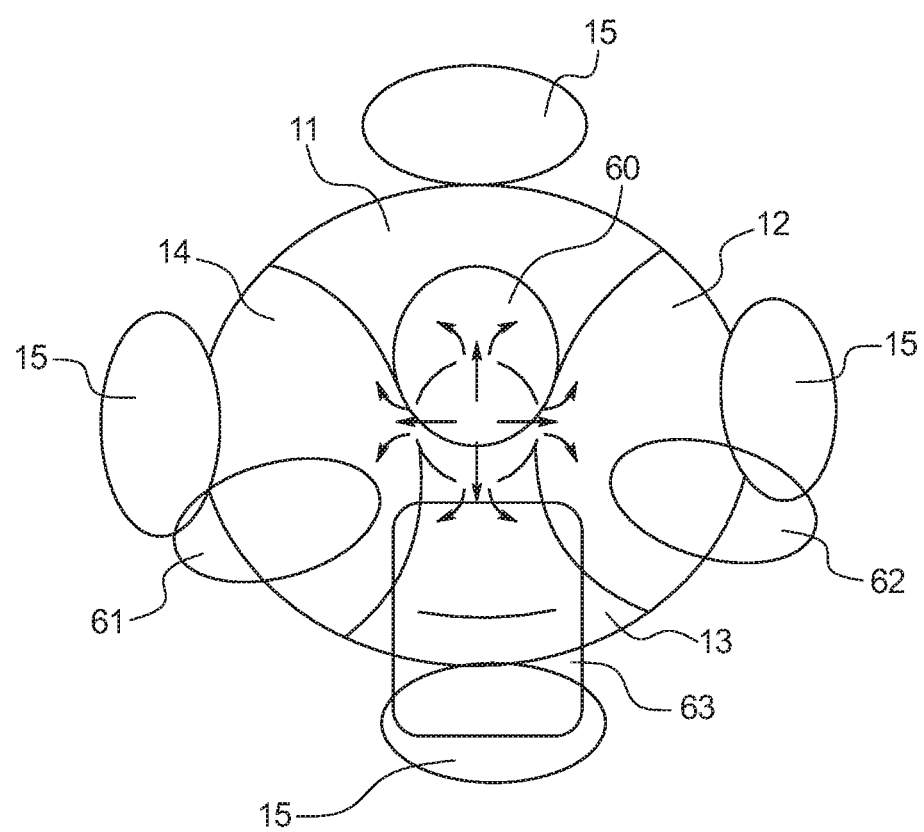
FIG. 9 is a schematic of the present airbag system of FIG. 7 in a deployed state further identifying contact zones.

FIG. 9 shows a front view of the deployed airbag depicted in FIG. 7. In this embodiment, the gas flows from a central chamber 10 into the peripheral chambers 11, 12, 13, 14 and then into the additional peripheral chambers 15. The head impact zone 60 comprises portions of the top peripheral chamber 11 and the central chamber 10. The left should impact zone 61 comprises portions of the left peripheral chamber 14 and the adjacent additional peripheral chamber 15. The right shoulder impact zone 62 comprises portions of the right peripheral chamber 12 and the adjacent additional peripheral chamber 15. The chest impact zone 63 comprises portions of the left peripheral chamber 14, the right peripheral chamber 12, the bottom peripheral chamber 13, and the additional peripheral chamber 15 immediately adjacent to the bottom peripheral chamber 13. Although the gas flow is not shown, gas must be able to pass from the peripheral chamber 11, 12, 13, 14 to the adjacent additional peripheral chamber 15. One or more affer vents 50 may be disposed within any or all of the dividers 40 present in this embodiment, including dividers 40 between the peripheral chambers 11, 12, 13, 14 and the adjacent additional peripheral chambers 15 (not shown). Further, baffle vents 50 may be disposed in the dividers between the different peripheral chambers 11, 12, 13, 14 (not shown). Still further, baffle vents 50 may be disposed in the dividers between the central chamber 10 and the adjacent peripheral chambers 11, 12, 13, 14. The presence of these baffle vents 50 will control the pressure differentials between the different chambers.

Figure 10:
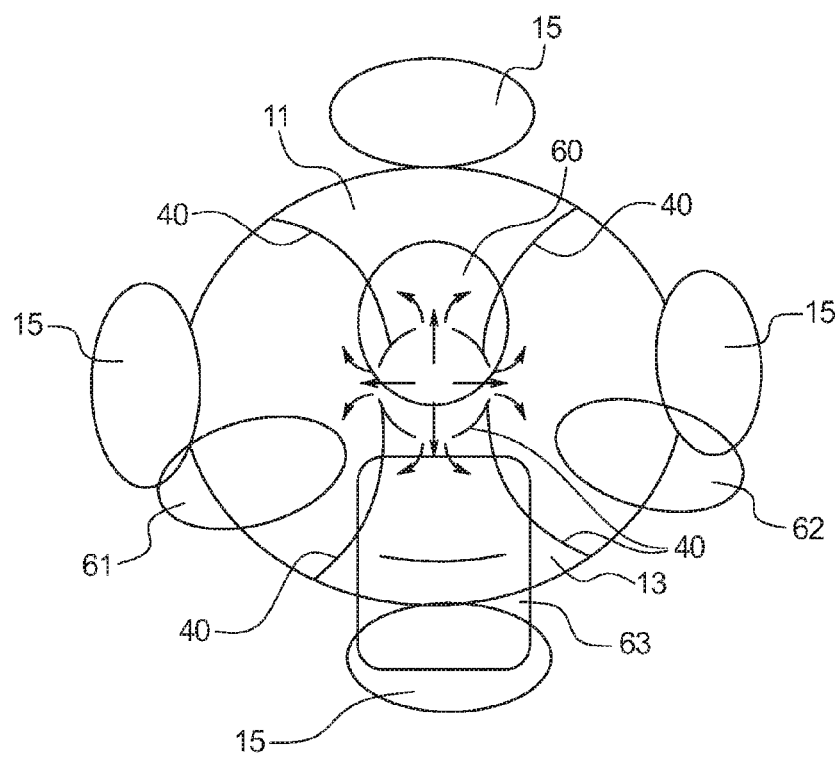
FIGS. 10-11 shows the front view of aspects of different embodiments of the present airbag system in a deployed state.
Figure 11:
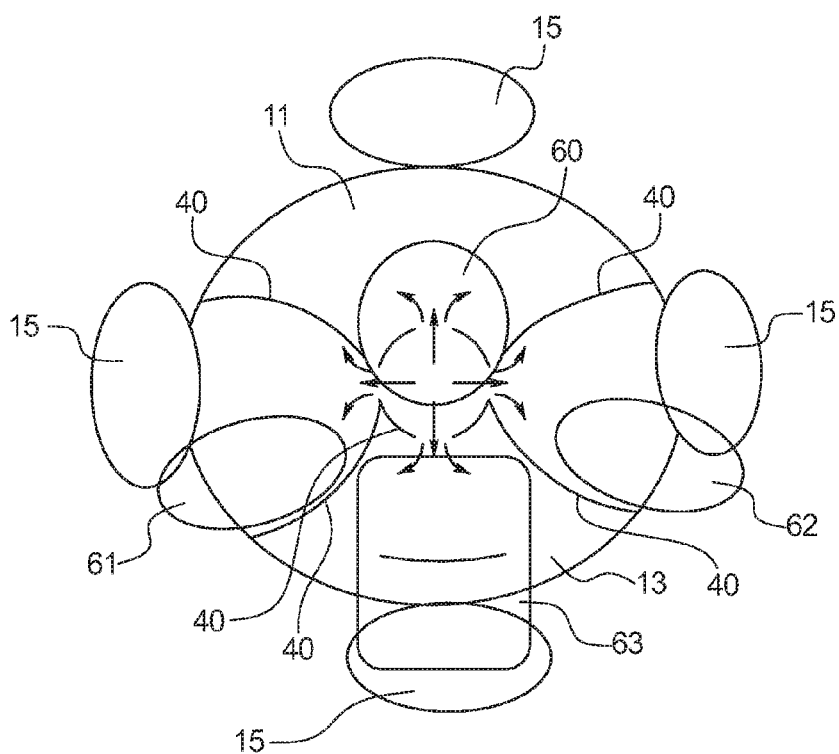

FIGS. 10-11 depict alternative embodiments of the present airbag. In these embodiments the dividers 40 are shown to define peripheral chambers 11, 12, 13, 14 of different shapes. In order to prevent the passenger from contacting an aspect of the vehicle, different peripheral chamber designs may be used. These divider configurations may be customized for a type of vehicle (e.g., car or truck), country or region of vehicle operation (e.g., North America or Europe), or other considerations known to persons skilled in the art.

We claim:
1. An airbag system comprising:
   an airbag comprising a center chamber and two peripheral chambers;

an inflator in fluid communication with the center chamber;

the center chamber in fluid communication with the two peripheral chambers via internal baffle vents, wherein each internal baffle vent comprises:

a center gas flow hole configured to remain open at all times and allow fluid to freely pass between the center chamber and one of the two peripheral chambers and one or more peripheral gas flow holes configured to open to allow fluid to freely pass from the center chamber to one of the two peripheral chambers and to close to prevent fluid from flowing from the one of the two peripheral chambers into the center chamber.

2. The airbag system of claim 1, wherein a gas pressure within the two peripheral chambers is greater than a pressure in the center chamber when the airbag is fully inflated.

3. The airbag system of claim 1, wherein each of the two peripheral chambers is configured to receive a passenger's head, chest, left shoulder, or right shoulder.

4. The airbag system of claim 3, wherein at least one of the two peripheral chambers further comprises a tether.

5. The airbag system of claim 3, wherein the peripheral chamber configured to receive the passenger's chest comprises a chamber with a pressure in a range from about 120 to about 170 kPa.

6. The airbag system of claim 3, wherein the peripheral chamber configured to receive the passenger's chest comprises a chamber with a depth in a range from about 4 inches to about 13 inches.

7. The airbag system of claim 3, wherein the peripheral chamber configured to receive the passenger's head comprises a chamber with a pressure in a range from about 120 to about 200 kPa.

8. The airbag system of claim 3, wherein the peripheral chamber configured to receive the passenger's head comprises a chamber with a depth in a range from about 6 inches to about 16 inches.

9. The airbag system of claim 3, wherein the peripheral chamber configured to receive the passenger's left shoulder comprises a chamber with a pressure in a range from about 120 to about 200 kPa.

10. The airbag system of claim 3, wherein the peripheral chamber configured to receive the passenger's right shoulder comprises a chamber with a pressure in a range from about 120 to about 200 kPa.

11. The airbag system of claim 3, wherein the peripheral chamber configured to receive the passenger's left shoulder comprises a chamber with a depth in a range from about 6 to about 16 inches; wherein the peripheral chamber configured to receive the passenger's right shoulder comprises a chamber with a depth in a range from about 6 to about 16 inches.

12. The airbag system of claim 1, wherein each internal baffle vent is disposed over a hole in a chamber divider, wherein the chamber divider substantially separates adjacent chambers.

13. The airbag system of claim 12, wherein the one or more peripheral gas flow holes are partially or completely blocked by a portion of the chamber divider when fluid attempts to enter the center chamber from one of the two peripheral chambers.

14. The airbag system of claim 12, wherein the chamber divider comprises fabric.

15. The airbag system of claim 1, wherein the one or more peripheral gas flow holes comprise two or more peripheral gas flow holes, wherein the two or more peripheral gas flow holes are located approximately the same radial distance from the center gas flow hole.

16. The airbag system of claim 1, wherein the one or more peripheral gas flow holes configured to prevent fluid from flowing from one of the two peripheral chambers into the center chamber comprises one or more flaps located in the one of the two peripheral chambers configured to partially or completely cover the one or more peripheral gas flow holes when fluid attempts to enter the center chamber.

17. The airbag system of claim 16, wherein the one or more flaps located in the one of the two peripheral chambers configured to partially or completely cover the one or more peripheral gas flow holes when fluid attempts to enter the center chamber comprises four flaps individually disposed over four peripheral gas flow holes.

18. An airbag deployment method comprising:
obtaining, by a sensor, data external to a vehicle;
identifying, by a controller using the data, a sudden deceleration;
deploying an airbag system as described in claim 1.

19. A vehicle comprising an airbag system as described in claim 1.

20. A vehicle airbag comprising:
internal baffles vent disposed between a central chamber and two adjacent peripheral chambers,
wherein each internal baffle vent comprises an always open central fluid passage and a plurality of peripheral fluid passages, wherein the peripheral fluid passages are configured to allow fluid to flow freely from the central chamber to an adjacent peripheral chamber and prevent fluid from flowing from the adjacent peripheral chamber to the central chamber.

* * * * *